Oct. 28, 1930.　　　W. M. GRIFFIN ET AL　　　1,779,670
TIRE INFLATER MECHANISM
Filed June 3, 1929　　　3 Sheets-Sheet 1

William M. Griffin
Robert J. Jauch
Walter A. Knight
Bennett R. Knight
INVENTORS
BY
ATTORNEYS.

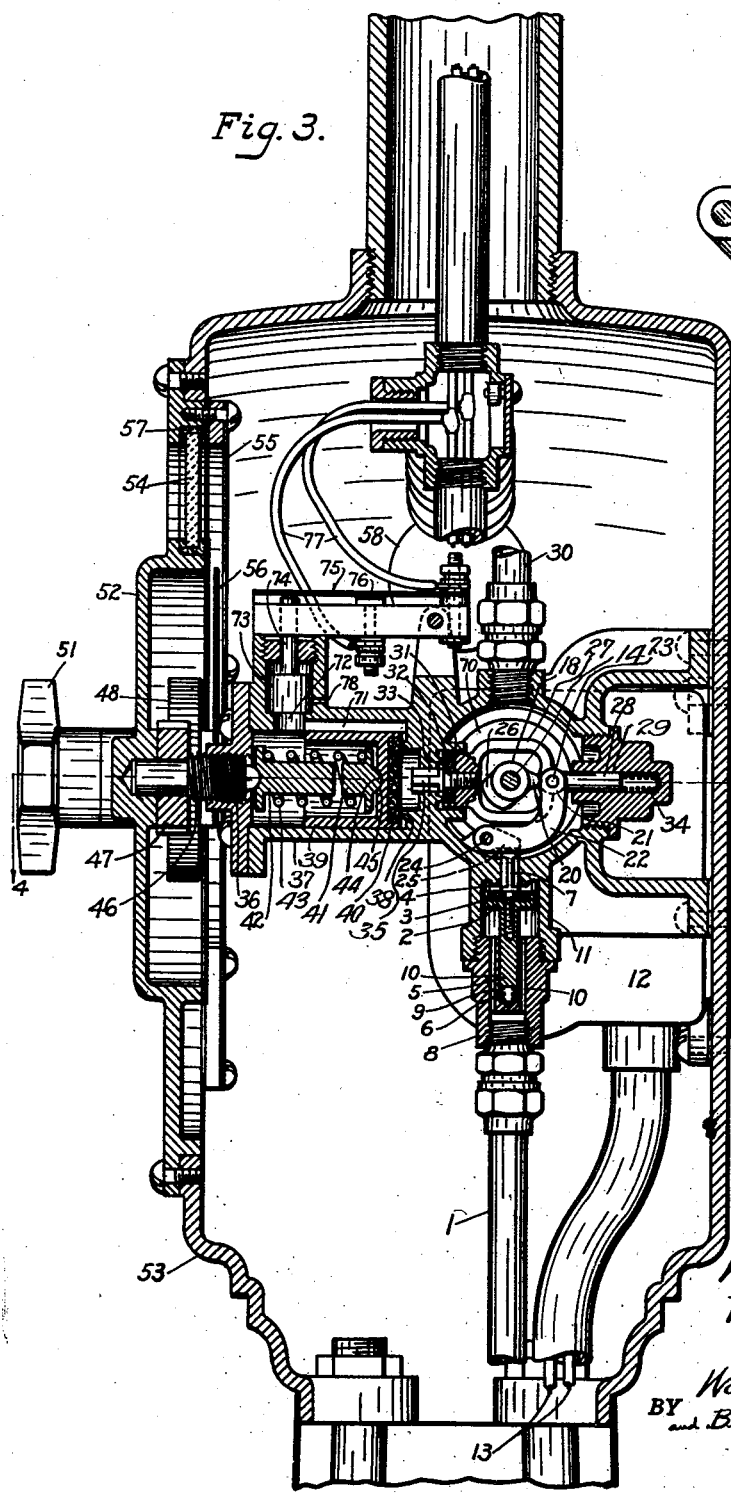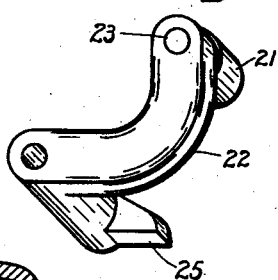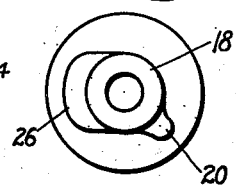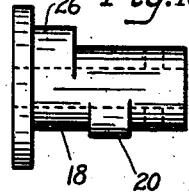

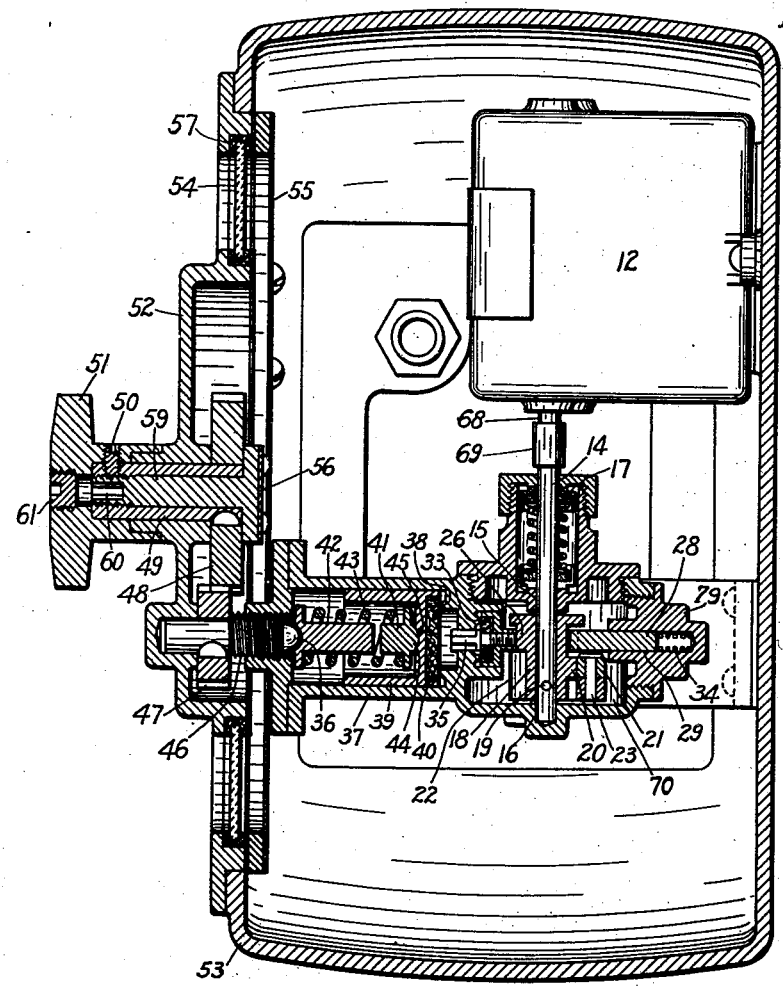

Patented Oct. 28, 1930

1,779,670

UNITED STATES PATENT OFFICE

WILLIAM M. GRIFFIN AND ROBERT J. JAUCH, OF FORT WAYNE, INDIANA, ASSIGNORS TO WAYNE COMPANY, OF FORT WAYNE, INDIANA, A CORPORATION OF INDIANA

TIRE-INFLATER MECHANISM

Application filed June 3, 1929. Serial No. 368,169.

Our invention relates to apparatus through which compressed air is supplied from any suitable source of supply as the storage tank of an air compressor to a pneumatic tire of a wheel, or other receptacle. The invention is particularly designed for use on such apparatus of the so-called automatic type, in which the apparatus is set to inflate the tire to a predetermined pressure, and when that pressure is reached the apparatus shuts down, that is it will prevent more air being supplied through it. Such automatic devices are preferred by the public, because they make it unnecessary to apply the tire chuck, inflate the tire for awhile, then remove the chuck and apply a gauge to see what the air pressure in the tire then is, and by repetitions of this process inflate the tire to the approximate pressure desired.

Our invention involves inflator apparatus of the intermittent type and the principal object is to provide positively operating mechanical means for opening and closing the air inlet valve instead of depending upon the unbalancing of pressures to open the inlet valve.

Another object of our invention is to provide means for preventing the operation of the exhaust valve means, during the time compressed air is flowing from the source of supply through the apparatus to the tire and for a sufficient time after the closing of the inlet valve to permit the pressure in the apparatus chamber, tire and conduit connection between the chamber and tire to become equalized, and after that interval of time has elapsed positively operating mechanical means for opening a port leading from the chamber to the exhaust valve.

Another object of our invention is to provide means for letting enough air out of the tire or other receptacles whenever it has been over supplied to bring the air pressure therein down to the predetermined pressure. The means supplied is capable of so reducing the pressure under all conditions of service.

Figure 1:
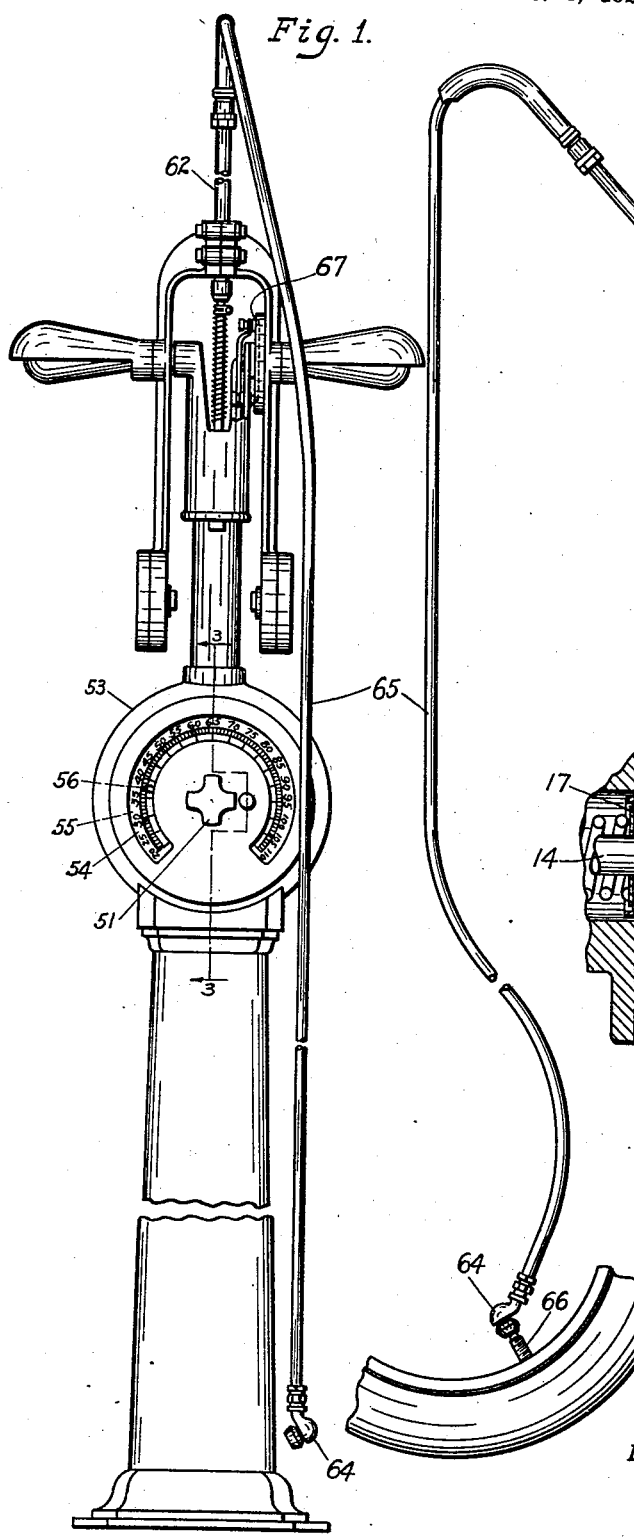
Figure 2:
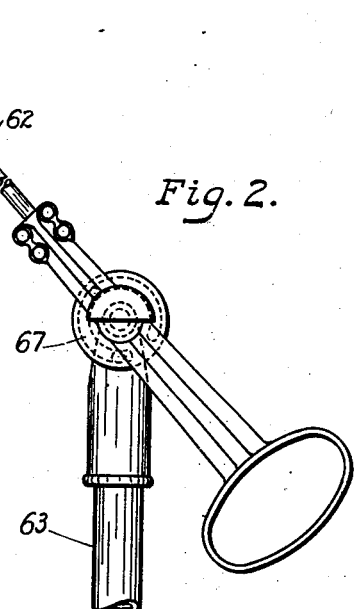
Figure 7:
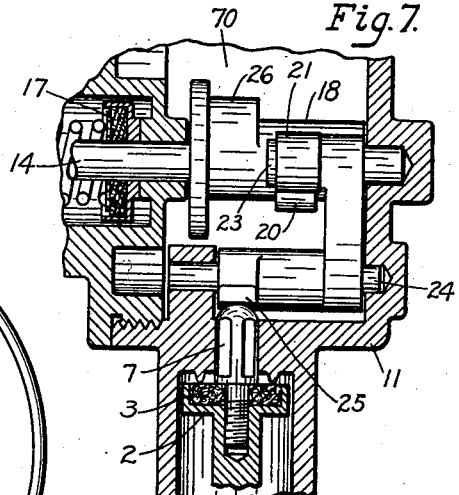

The particular embodiment of our invention selected for illustration is a tire inflating apparatus in which:

Figure 1 is a front elevation of the apparatus with parts broken away to shorten the view, Fig. 2, is a side elevation of the top of the apparatus at right angles to Fig. 1, with the lower portion broken away and the tower pulled over to tire inflating position and with the outlet conduit provided with a tire chuck in position on the tire tube valve for inflating the tire, portions of the tire being broken away, Fig. 3, is a vertical section through the operating mechanism of the inflater on the line 3—3 of Fig. 1, with unnecessary portions above and below broken away and with the bent lever shown in full in front of the section line, Fig. 4, is a horizontal section on the line 4—4 of Fig. 3, shown as a true section, Fig. 5, an enlarged detail, shows the yoke and its valve in section and the fluted guide stem in full, Fig. 6, an enlarged detail, is an end view of the yoke from the valve end, Fig. 7, an enlarged detail, is a horizontal section showing a part of the assembly for the control of the inlet valve and its coacting valve, Fig. 8, an enlarged detail, is a perspective view of the bent lever, Fig. 9, an enlarged detail, is an end view of the cam member, and Fig. 10, an enlarged view, is a top plan view of the cam member.

Referring now to the drawings; 1 is the conduit through which the air under pressure flows from a source of supply not shown to a downwardly opening poppet valve 2. This valve is preferably cup-shaped to receive a disc 3 of suitable material which rests upon the seat 4 when the valve is closed. The valve 2 has an integrally-formed downwardly extending axial guide 5 seated upon a light coiled spring 6 which normally holds the valve 2 closed. A fluted pusher pin 7 axial of the valve 2 extends upwardly for a purpose to be hereinafter described also acting as a guide.

The conduit 1 is threaded into a valve cap 8 bored at 9 to receive the guide 5, and having longitudinal holes 10 to permit free passage of the air to the valve 2. The cap 8 is threaded into the valve body 11, within which the valve seat 4 is formed.

A driving mechanism 12, the one shown being operated by electricity supplied through lead wires (not shown), rotates a shaft 14, journalled at 16 in the valve body 11, and 15 in stuffing box 17. A cam-member 18, secured to shaft 14 by pin 19 or other suitable means, has a cam 20 adapted to engage a roller 21 at each revolution of the cam shaft 14. The roller 21 is mounted on stud 23 secured to the bent lever 22 which lever is pivoted at its lower end on the shaft 24. A cam lug 25 is made integral with the lever 22 so that when said cam lug is actuated by the cam 20, the cam lug 25 bears upon the top of the pusher pin 7, depressing it and opening the valve 2.

The cam member 18 has another cam 26 adapted to actuate a yoke 27, one end of which is provided with stem 28 adapted to reciprocate in a guide 29 bored in the cap 79 threaded to the valve body 11. On the other end of the yoke 27 is formed a valve 31, preferably cup-shaped to receive a disc 32 of suitable material which rests upon the seat 33 formed in the valve body 11 when the valve is closed. A fluted guide 35 is threaded axially into the valve 31. A light coiled spring 34 assists compressed air in the valve body chamber in keeping the valve closed.

An outlet conduit 30 is threaded into the valve body 11, and through this conduit air flows through an ordinary chuck to the inlet valve of a tire or other receptacle.

Axially of the valve 31 the valve body 11 is provided with a cylindrical projecting portion 37 within which is formed a valve seat 38. A piston valve 39 has its head formed cup-shaped to receive a disc 40 of suitable material which rests on the seat 38. A combined plate and guide for the spring 43 is formed of two parts 41 and 42. The part 41 has a rounded projecting outer end 44 adapted to rest in a recess 45 on the inside of the piston head, axially thereof. The part 42 has an axial recess on the outside of its outer end, in which is seated the rounded end 36 of an adjusting screw 46, adapted to be rotated through the pinion 47 fixed to the screw 46, by means of the driving gear 48 fixed to the sleeve 49 which is in turn secured by the screw 50 to adjusting knob 51. The sleeve 49 seats in a bearing bored in the plate 52 fitted on the casing 53. An arcuate glass window 54 is provided in the plate 52 through which the graduated dial 55 and the pointer 56 may be seen. A gasket 57 is provided to make the window opening rain proof. The dial is preferably made of translucent material, so that when the electric light bulb 58 within the casing 53 is lighted, the figures may be plainly read and the position of the pointer seen.

The pointer 56 is secured to a pointer pin 59 threaded on its outer end into the sleeve 49 and this outer end is bored and formed with a wrench socket 60, so that when the screw 61 is removed and screw 50 loosened a socket wrench may be inserted to adjust the radial position of the pointer.

The operation of the device illustrated and described is as follows:

The device having been connected with a source of supply of compressed air having a plentiful supply with air of ample pressure, and it being desired for example to inflate the pneumatic tire 67 to 38 pounds pressure. The dial pointer 56 is adjusted by rotating the knob 51 by hand until the pointer 56 coincides with the graduation on the graduated dial 55. This rotation of the knob 51 has through the driving gear 48 and pinion 47 rotated the adjusting screw 46 and compressed the spring 43 causing the piston valve 39, with its disc 40, to be seated on the valve seat 33 at the proper tension for that setting.

The arm 62 of tower 63 is then pulled downwardly to permit chuck 64 on outer end of hose 65 to be fitted onto tire tube valve 66 so that air may pass into tire 67 which it is desired to inflate.

When arm 62 is swung downwardly, electrical contact is made through switch 67 thereby completing circuit to motor 12, setting same in motion.

Valve shaft 14 being connected to motor shaft 68 by coupling 69 is caused to rotate when motor 12 is in operation. Likewise cam body 18 being secured to shaft 14 is caused to revolve. In its revolution cam body 18 causes inlet valve cam 20 and exhaust valve cam 26 which are integral parts thereof to alternately open inlet valve 2 and exhaust valve 31 respectively.

The opening of inlet valve 2 is accomplished when inlet valve cam 20 or integral part of cam body 18 in its rotation engages roller 21 rotatively mounted on stud 23 secured to bent lever 22, thereby causing said bent lever 22 to rotate on shaft 24. By means of cam lug 25, an integral part of bent lever 22 adapted to engage fluted pusher pin 7 axial of inlet valve 2, said inlet valve 2 is caused to be pushed downwardly allowing air entering through conduit 1 and holes 10 to enter chamber 70 of valve body. The air thus admitted being conducted through conduit 30 to tire as subsequently explained.

The opening of exhaust valve 31 which is an integral part of yoke 27 is accomplished by exhaust valve cam 26, an integral part of cam body 18, in its rotation engaging lug 79 on the inner face of yoke 27 opposite exhaust valve 31 and causing said yoke 27 to move laterally opening said exhaust valve 31 and allowing air to pass from chamber 31 into contact with spring loaded valve 39.

The opening of inlet valve 2 allows air to be admitted from an air storage tank (not shown) through conduit 1 into chamber 70 of valve body 11 and is thence delivered through conduit 30, arm 62, hose 65, and chuck 64 to tire 67.

The interval between the closing of inlet valve 2 and the opening of exhaust valve 31 determined by the location of cams 20 and 26 respectively on cam body 18 allows pressure of air in tire 67, hose 65, arm 62, conduit 30 and chamber 70 to equalize.

The opening of exhaust valve 31 admits air against spring loaded valve 39 in chamber 37 which is held against its seat 38 by spring 43, said spring 43 being so correctly designed that the pressure exerted on valve 39 adjusted by knob 51 through gears 47 and 48 and screw 46 will correspond with indicated predetermined setting of dial 55.

When the equalized pressure in chamber 70 reaches a point in excess of predetermined pressure desired, which in the case considered is 38 lbs. valve 39 will be forced open allowing air to pass through conduit 71 into chamber 72 forcing valve 73 upwardly so that its stem 74 will engage spring switch 75 lifting same and opening contact points 76 thereby breaking electrical circuit 77 which is connected to motor 12 thereby causing said motor 12 to cease operating.

A small port 78 through wall of chamber 72 is located so as to be opened when valve 73 has reached its extreme upward point of travel to disengage switch 75 and thus permit the escape of excess air in chambers 72—70, conduit 30, arm 62, hose 65 and tire 67. When excess pressure has been exhausted through port 78 valve 73 will drop to bottom of chamber 72, electrical circuit will again be completed through contact points 76, and motor 12 will resume operation and cycle will again be resumed as explained.

It will be seen that conversely, should customer already have excess pressure in tire 67 by placing chuck 64 on tire valve tube 66 said excess pressure equalizing in device will cause mechanism to operate as previously described and permit such excess pressure to escape through port 78.

The device will remain inoperative with exhaust valve 31 in an open position so long as pressure in excess of predetermined setting on dial 56 or when arm 62 of tower 63 is in a vertical position.

We claim as our invention and desire to secure by Letters Patent of the United States:

1. In a device for charging a receiver with compressed air, the combination of a source of compressed air, a conduit connecting the source of compressed air with the receiver, a chamber in said conduit, a normally closed inlet valve, a port from said chamber to an escape valve, an escape valve normally closing said port outside the chamber by a load, means for varying said load, a normally closed guard valve for closing said port on the inside of the chamber, and combined mechanical means for opening said inlet valve and said guard valve alternately and causing each to dwell in open position temporarily at regular intervals.

2. In a device for charging a receiver with compressed air, the combination of a source of compressed air, a conduit connecting the source of compressed air with the receiver, a chamber in said conduit, a normally closed inlet valve, a port from said chamber to an escape valve, an escape valve normally closing said port outside the chamber by a load, means for varying said load, a normally closed guard valve for closing said port on the inside of the chamber, combined mechanical means for opening said inlet valve and said guard valve alternately and causing each to dwell in open position temporarily at regular intervals and a normally closed outlet valve in said conduit opened by the pressure of air flowing through the conduit from the source of supply.

3. In a device for charging a receiver with compressed air, the combinaton of a source of compressed air, a conduit connecting the source of compressed air with the receiver, a chamber in said conduit, a normally closed inlet valve, a port from said chamber to an escape valve closing in the direction of flow of air from said source, an escape valve normally closing said port outside the chamber by a load, means for varying said load, a normally closed guard valve for closing said port on the inside of the chamber, and combined cam means for opening said inlet valve and said guard valve alternately and causing each to dwell in open position temporarily at regular intervals.

4. In a device for charging a receiver with compressed air, the combination of a source of compressed air, a conduit connecting the source of compressed air with the receiver, a chamber in said conduit, a normally closed inlet valve closing in the direction of flow of air from said source, a port from said chamber to an escape valve, an escape valve normally closing said port outside the chamber by a load, means for varying said load, a normally closed guard valve for closing said port on the inside of the chamber, combined cam means for opening said inlet valve and said guard valve alternately and causing each to dwell in open position temporarily at regular intervals and a normally closed outlet valve in said conduit opened by the pressure of air flowing through the conduit from the source of supply.

In testimony whereof we have hereunto set our hands.

WILLIAM M. GRIFFIN.
ROBERT J. JAUCH.